(12) United States Patent
Conrad

(10) Patent No.: US 12,116,036 B2
(45) Date of Patent: Oct. 15, 2024

(54) QUICK COUPLING SYSTEM FOR A VEHICLE STEERING WHEEL

(71) Applicant: ENDOR AG, Landshut (DE)

(72) Inventor: Bernhard Conrad, Buch am Erlbach (DE)

(73) Assignee: Endor AG, Landshut (DE)

(*) Notice: Subject to any disclaimer, the term of this patent is extended or adjusted under 35 U.S.C. 154(b) by 0 days.

(21) Appl. No.: 17/767,599

(22) PCT Filed: Oct. 9, 2020

(86) PCT No.: PCT/DE2020/100878
§ 371 (c)(1),
(2) Date: Apr. 8, 2022

(87) PCT Pub. No.: WO2021/069031
PCT Pub. Date: Apr. 15, 2021

(65) Prior Publication Data
US 2024/0075978 A1 Mar. 7, 2024

(30) Foreign Application Priority Data
Oct. 9, 2019 (DE) .......................... 202019105567.7

(51) Int. Cl.
B62D 1/10 (2006.01)
B60R 16/027 (2006.01)
H01R 13/631 (2006.01)

(52) U.S. Cl.
CPC .............. B62D 1/10 (2013.01); B60R 16/027 (2013.01); H01R 13/631 (2013.01); H01R 2201/26 (2013.01)

(58) Field of Classification Search
None
See application file for complete search history.

(56) References Cited

U.S. PATENT DOCUMENTS

| 2013/0118297 | A1  | 5/2013 | Goh et al. |
| 2015/0217795 | A1* | 8/2015 | Barnes ................ F16D 1/06 403/334 |
| 2017/0101124 | A1  | 4/2017 | Assmann et al. |

FOREIGN PATENT DOCUMENTS

| CN | 104386113 A | 3/2015 |
| CN | 205059711 U | 3/2016 |

(Continued)

OTHER PUBLICATIONS

Chinese Patent Office action dated Jun. 29, 2023 in Chinese patent application 202080067775.4.

(Continued)

Primary Examiner — Tho D Ta
(74) Attorney, Agent, or Firm — Calvert Technology Law, PLLC; Nathan H. Calvert

(57) ABSTRACT

A quick coupling system for a steering wheel with a steering wheel-side coupling part and a vehicle-side coupling part, which may be pushed together along a longitudinal axis to mechanically engage with one another in a positive locking manner in an assembled state. The vehicle-side coupling part has an engagement element and the steering wheel-side coupling part has an element complementary thereto, which can engage only with the correct orientation with respect to the longitudinal axial rotational position. The engagement elements are each arranged at least in the front region of the coupling parts and cooperate in such a way that even a partial pushing together in incorrect orientation is prevented.

9 Claims, 3 Drawing Sheets

(56) References Cited

FOREIGN PATENT DOCUMENTS

| | | | |
|---|---|---|---|
| CN | 205952045 | U | 2/2017 |
| DE | 60107023 | T2 | 11/2005 |
| DE | 102015219645 | A1 | 4/2017 |
| EP | 1179469 | A1 | 2/2002 |
| GB | 199959 | A | 7/1923 |
| JP | 2002087283 | A | 3/2002 |
| JP | 2003212130 | A | 7/2003 |
| KR | 20040088214 | A | 10/2004 |

OTHER PUBLICATIONS

International Search Report & Written Opinion dated Jan. 20, 2021 in PCTDE2020100878.
Japanese Patent Office Action dated Jun. 25, 2024 in Japanese patent application 2022-521090.

* cited by examiner

QUICK COUPLING SYSTEM FOR A VEHICLE STEERING WHEEL

TECHNICAL FIELD OF THE INVENTION

The invention relates to a quick coupling system for a vehicle steering wheel, such as for race cars, simulators and game consoles, for example.

Such quick coupling systems for steering wheels are used, for example, in racing, for allowing a quick entry and exit of the driver, for the purpose of which the steering wheel is removed, or for allowing a quick exchange of the steering wheel during a pit stop.

BACKGROUND OF THE INVENTION

Conventional quick coupling systems for steering wheels, such as, for example, a steering wheel quick release of type QR-03 (manufacturer's designation) of the company Krontec Maschinenbau GmbH, allow a quick mechanical attachment or disassembly of a steering wheel in a vehicle without the use of tools.

Disadvantageously, in known systems, an electrical plug-in connection, which is also present, can become damaged when handled carelessly, in particular when coupling parts are incorrectly attached.

In addition, in known systems, a careless handling in the form of an incorrect positioning, in particular an incorrect orientation of the coupling parts with respect to one another, is possible, so that a correction by a reattaching requires additional time, which is undesirable for obvious reasons precisely in the racing field, in particular during a race.

In an extreme case, it is even possible for an incorrect orientation to establish a mechanical connection that indeed does not actually engage but that briefly appears to secure the steering wheel, so that the user may overlook this in a stressful situation. In the worst case, the steering wheel may become loose while driving and cause an accident.

SUMMARY OF THE INVENTION

Therefore, it is one underlying object of the present invention to create a quick coupling system for a vehicle steering wheel that prevents the problems explained above, allows quick reliable assembly and disassembly of a steering wheel and prevents an undesirable loss of time, in particular during assembly to an assembled state. This may be achieved according to embodiments of the invention by a quick coupling system for a vehicle steering wheel having features described herein. In one aspect, engaging elements structured complementary to each other may be included on a vehicle-side coupling part and a steering wheel-side coupling part at least in front regions of the respective coupling parts. (Herein, "engaging elements" may also be referred to as "engagement elements.") These engaging elements cooperate by contacting one another in such a way that when they are rotated about a longitudinal axis with respect to one another in an incorrect orientation for assembly, they prevent the coupling parts from being pushed together by more than a first threshold distance along their shared longitudinal axis. As used herein, the "first threshold distance" may be a predetermined distance that is one fifth of total possible insertion depth of one coupling part in the other or, alternatively, one tenth, for example. The total possible insertion depth may be referred to herein as the "connecting distance." The engaging elements may permit longitudinal insertion of one coupling part into the other by less than the first threshold amount as a centering aid in correctly placing front ends of the coupling parts together in correct rotational orientation as will be discussed further below.

As a result, advantageously, during assembly of the coupling parts, a rotated position (misalignment) of the coupling parts with respect to one another can nevertheless occur for a pushing together up to the first threshold distance but further insertion beyond that small first threshold distance is prevented until the coupling parts are substantially correctly positioned with respect to one another.

Due to structural features described herein, the coupling parts cannot become jammed together, as could occur if they were not prevented from being pushed together in an incorrectly rotated position beyond the first threshold amount. Correspondingly, the need to perform a substantial disassembly of incorrectly positioned coupling parts is avoided. Even aside from mechanical damage, it is desirable to avoid disassembly of incorrectly positioned coupling parts, particularly when under time pressure.

In addition, the structural features described herein avoid mechanical damage that could otherwise occur by incorrectly jamming the coupling parts together too far. Likewise, damage to electrical contacts is avoided, if they are present as shown in embodiments illustrated herein. Incorrect electrical connections are also avoided.

Income embodiments, the engagement elements may include a non-rotationally symmetrical outer periphery for one coupling part and an inner periphery complementary thereto for the other coupling part. In profile, the peripheries may have, for example, irregular shapes that permit the outer periphery of one coupling part to be inserted beyond the first threshold amount into the inner periphery of the other coupling part only in one unique rotational position. In other embodiments axially symmetrical or even rotationally symmetrical profiles are provided that have recesses and/or projections that only permit inserting one coupling part into the other coupling part beyond the first threshold amount when the coupling parts are in one unique position.

As previously mentioned, the engaging elements in an embodiment of the present invention may permit longitudinal insertion of one coupling part into the other coupling part by less than the first threshold amount as part of a centering aid in correctly placing the front ends of the coupling parts together in correct rotational orientation. In one way of providing this centering aid, cooperating profiles of the coupling parts have spacing(s) between corresponding surfaces, so that when one coupling part is initially inserted into the other by less than a second threshold amount they allow a predetermined amount of play, that is, a slight rotation and/or a spacing, that is, offset, of the longitudinal axes of the two coupling parts. This initial play decreases with the longitudinal depth, which may be due to a corresponding decrease in size of the inner periphery or an increase in size of the outer periphery and/or a broadening or reduction in size of the engagement elements, so that the coupling parts in terms of rotation position and/or longitudinal position increasingly join automatically in the correct position as one coupling part is inserted further into the other beyond the second threshold distance.

In other embodiments of the present invention, the quick coupling system has electrical connection elements, such as in the form of plug contacts, which establish electrical connections when the coupling parts are in the assembled state, that is, when one coupling part is inserted fully into the other.

The quick connection system according to these embodiments thereby provides not only a mechanical connection for force transmission, but also electrical connections for the transmission of signals from the steering wheel to the vehicle or to the so-called wheel base of a game or simulator system and vice versa.

The electrical connection elements may be located in respective rear regions of the coupling parts, that is, the regions that engage only when one coupling part is almost fully inserted into the other. Further, the electrical connection elements may be fixed in rotational and concentric positions on the respective coupling parts so that they are electrically connected only when only when one coupling part is fully inserted into the other in a predetermined rotational and concentric alignment. An incorrect contacting is thereby excluded, as is damage to the contacts.

In some embodiments of the invention, the insertion aid is designed in the form of tongue and groove element, wherein the groove element toward the rear region has a narrowing width or the tongue element has a broadening width, in order to center the tongue element during the insertion and to position it correctly.

A quick coupling system described herein can be used for the steering wheel of a vehicle or for that of a vehicle simulator or vehicle driving game apparatus associated with a game console, for example.

These and other advantages and features of the invention will be apparent from the following description of representative embodiments, considered along with the accompanying drawings.

DESCRIPTION OF REPRESENTATIVE EMBODIMENTS

Figures 1, 2:
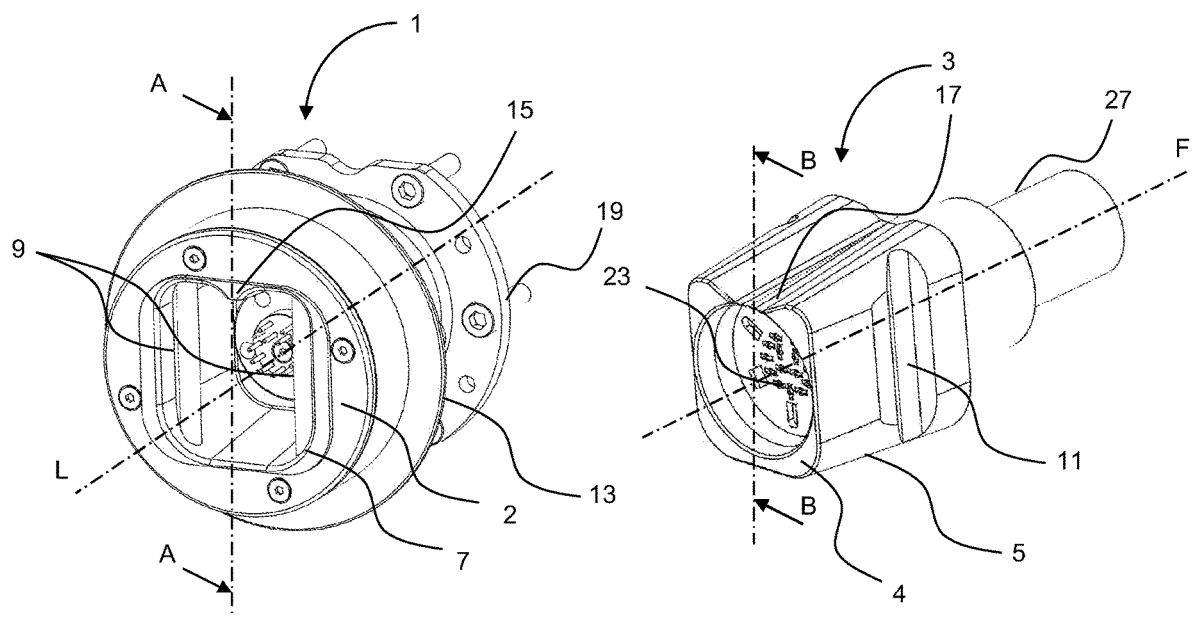
FIG. 1 shows a perspective view of a steering wheel-side coupling part of a quick coupling system according to the invention.
FIG. 2 shows a perspective view of a vehicle-side coupling part of a quick coupling system according to the invention.

The example steering wheel-side coupling part 1 shown in FIG. 1, starting from its front end 2, has a recess 7, which includes a rectangular opening (rectangular in a plane perpendicular to the axis L aside from rounded corners and the engagement element 15 described further below). A head 5 of the vehicle-side coupling part 3 shown in FIG. 2 can be inserted into this recess 7 by a connecting distance to place the two coupling parts in an assembled state.

On its rear side, the steering wheel-side coupling part 1 has a fixture 19 in the form of a flange for connecting a steering wheel (the steering wheel not shown in the drawing).

As can be seen in FIG. 2, head 5 of coupling part 3 has a substantially rectangular profile with respect to a plane extending perpendicular to the longitudinal axis F but narrowing, that is, tapering, toward its front end 4. On its rear side (that is, the side or end opposite to front end 4 along axis F), coupling part 3 is stationarily and non-rotatably connected to a steering column 27 of a vehicle or of a wheel box of a simulator or game system.

Figure 3:
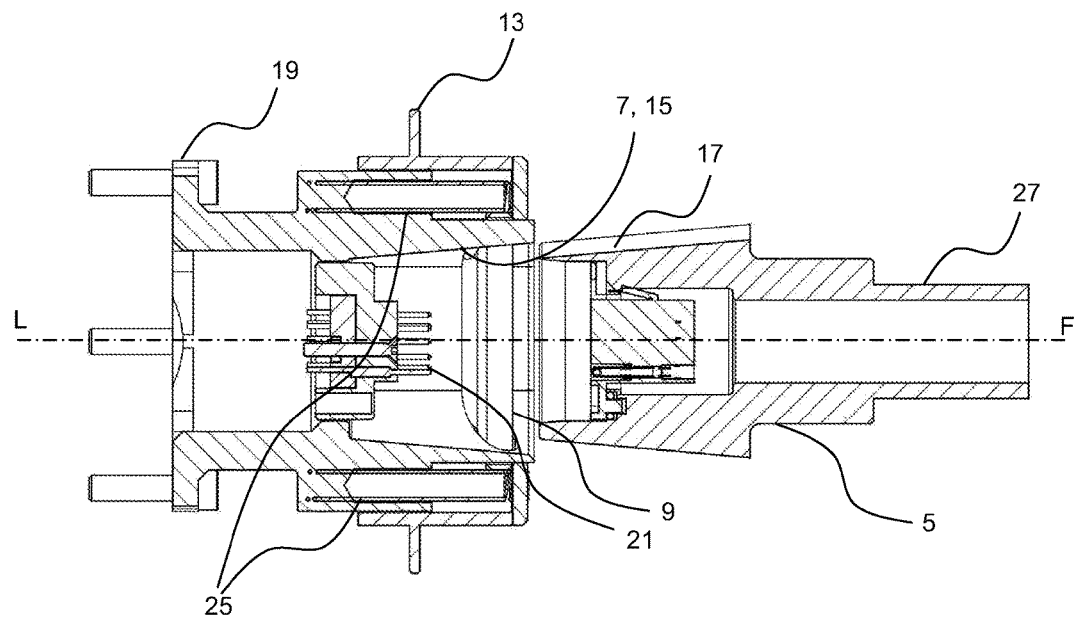
FIG. 3 shows a cross-sectional view of the steering wheel-side coupling part taken along line A-A in FIG. 1 and a cross-sectional view of the vehicle-side coupling part taken along line B-B in FIG. 2 shortly before the coupling parts according to FIG. 1 and FIG. 2 are pushed together with correct orientation with respect to each other.

As can be seen in FIG. 3, recess 7 is complementary in profile to head 5. That is, recess 7 is also substantially rectangular in a plane perpendicular to longitudinal axis L but tapers in the direction of its depth.

Figure 6:
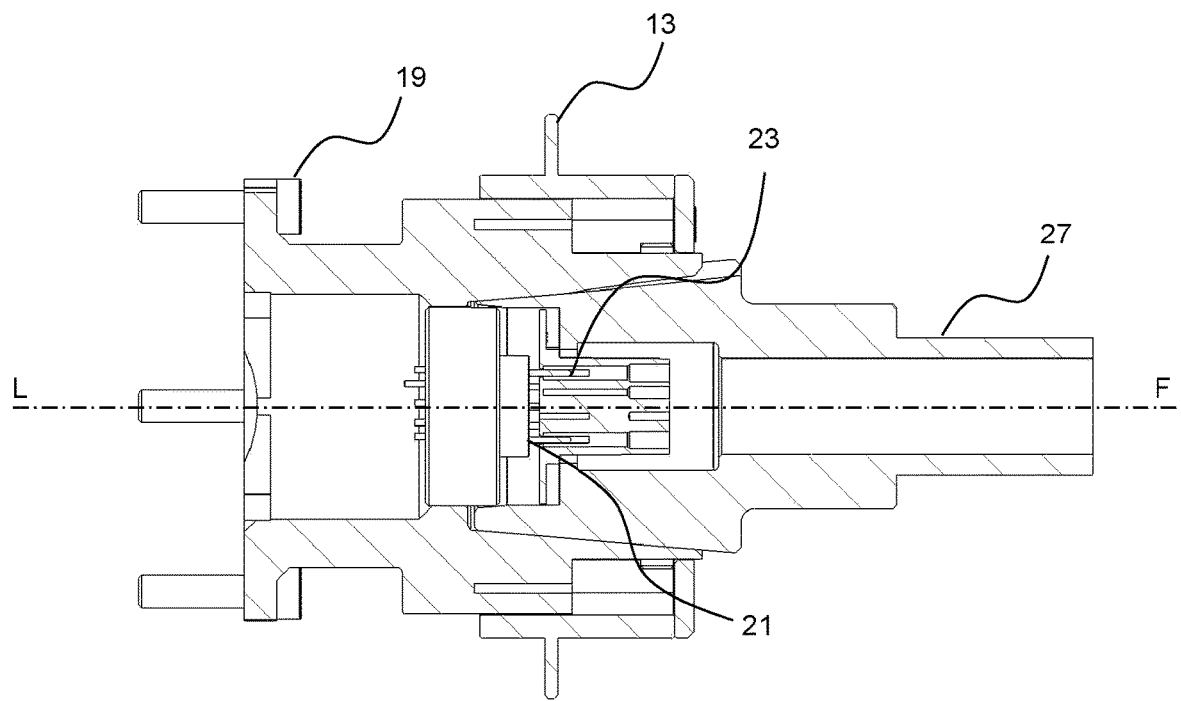
FIG. 6 shows a cross-sectional view according to FIG. 3, FIG. 4, and FIG. 5, in which the coupling parts according to FIG. 1 and FIG. 2 are completely pushed together.
Figure 7:
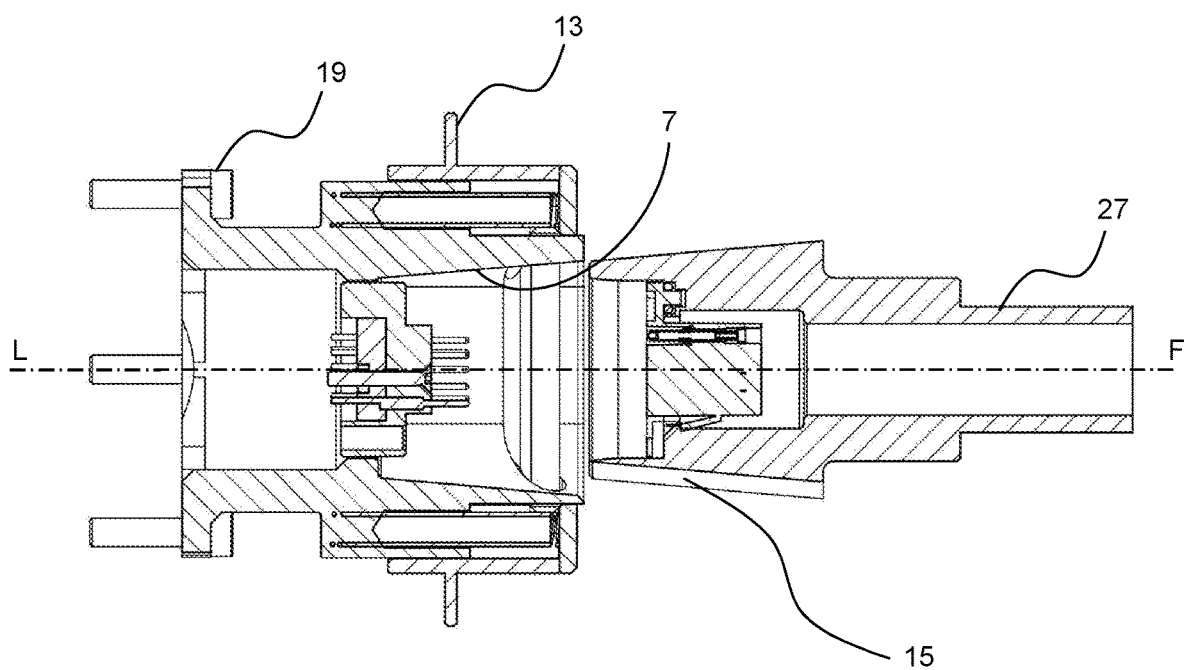
FIG. 7 shows a cross-sectional view analogous to FIG. 3 in the case of an incorrect orientation of the coupling parts with respect to each other.

When head 5 is in correct orientation (that is, with its front end 4 facing front end 2 of coupling part 1, with longitudinal axis F aligned with longitudinal axis L of coupling part 1, and with matching rotational orientation relative to the longitudinal axes L and F), head 5 may fit fully into recess 7. This completely inserted position is shown in FIG. 6 and represents an assembled state between coupling parts 1 and 3 in which the coupling parts extend along a system longitudinal center axis made up of axes L and F. To reach this assembled state, coupling part 1 has been pushed together with coupling part 3 along the system longitudinal center axis over a connecting distance representing the distance along the longitudinal axis between the front end 2 of coupling part 1 and the front end 4 of coupling part 3 (the depth of full insertion). In the assembled state between coupling parts 1 and 3, rods 9 engage in longitudinal grooves 11 formed on the outer periphery of the head 5, so that the mechanical connection of the coupling parts 1 and 3 is locked in this position. In order to release the rods 9 so that they can be moved outward in radial direction, a sleeve 13 arranged on the coupling part 1 can be retracted against a spring force of springs 25 in the axial direction (parallel to longitudinal axes L and F) and the recess 7 can be pulled off of head 5.

In order to ensure a correct orientation during the pushing together of the coupling parts 1 and 3, head 5 at least at one site in profile has an engagement element, for example in the form of a groove or recess 17. Complementarily thereto, the recess 7 in profile has an engagement element 15, for example in the form of a projection or tongue.

During a pushing together of the coupling parts 1 and 3, the engagement elements 15 and 17 engage with one another, in tongue and groove form in this example, in such a way that a correct orientation of the axial rotational position is already ensured during the first pushing together up to the complete assembly, that is, once the coupling parts 1 and 3 are pushed together beyond the first threshold distance.

Figure 4:
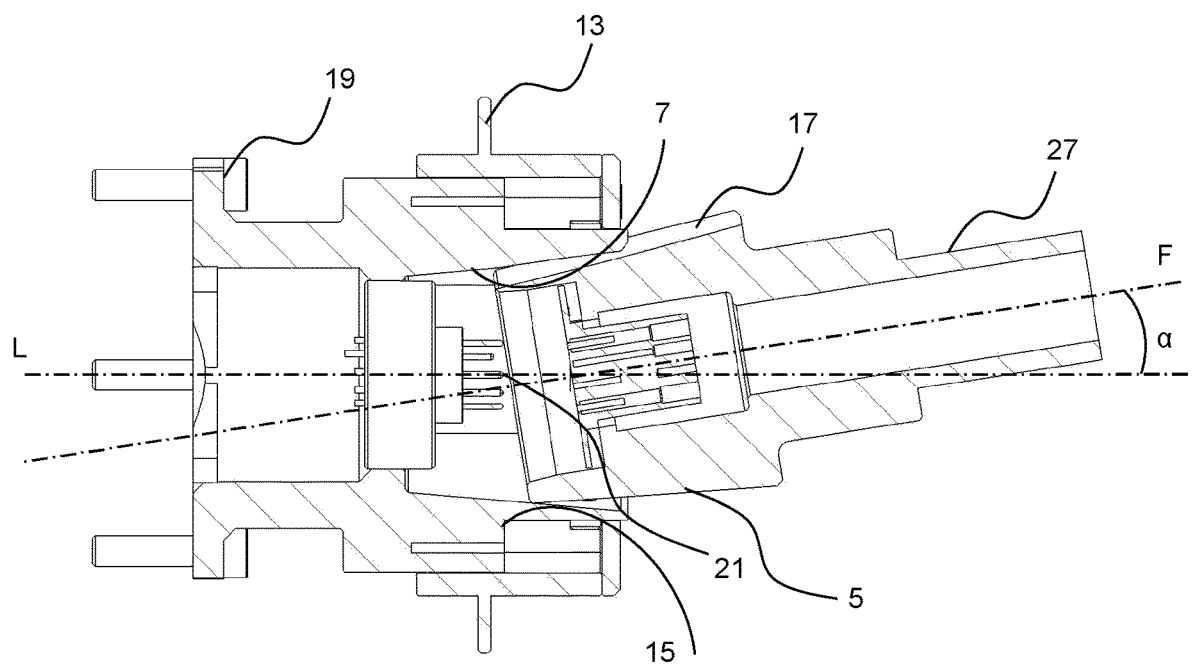
FIG. 4 shows a cross-sectional view according to FIG. 3, in which the coupling parts according to FIG. 1 and FIG. 2 are already partially pushed together.

As can be seen in FIG. 4, a parallel or even concentric position of the longitudinal axes L and F of the coupling parts 1 and 3 is not necessary at least up to a second threshold distance for insertion, since play present between outer periphery of the head 5 and recess 7 also allows an inclination of the coupling parts 1 and 3 with respect to one another, so that an angle α of up to 25°, preferably up to 15°, between the axes L and F is possible, without thereby preventing a pushing together. As shown in FIG. 4, this second threshold distance may be up to approximately one-half of the connecting distance required for full insertion of head 5 in recess 7.

Due to the play, which narrows as a function of the insertion depth, the head 5 is automatically centered in the recess 7 as the coupling parts 1 and 3 are pushed further together, so that the angle α becomes ever smaller and becomes zero in the final position of the assembled state shown in FIG. 6.

Therefore, due to the cooperation of the engagement elements 15 and 17, as the coupling parts 1 and 3 are pushed together beyond the first threshold distance, the correct orientation of the coupling parts 1 and 3 is already ensured with respect to one another and for a pushing together, and a pushing together in incorrect orientation is thus prevented, or an incorrect orientation is noticed right at the beginning of the assembly process. Moreover, play which is preferably present (for example, the complementary tapered design of head 5 and recess 7), which decreases during the insertion, acts as an insertion and centering aid, in order to ensure a correct final position and assembled state.

Figure 5:
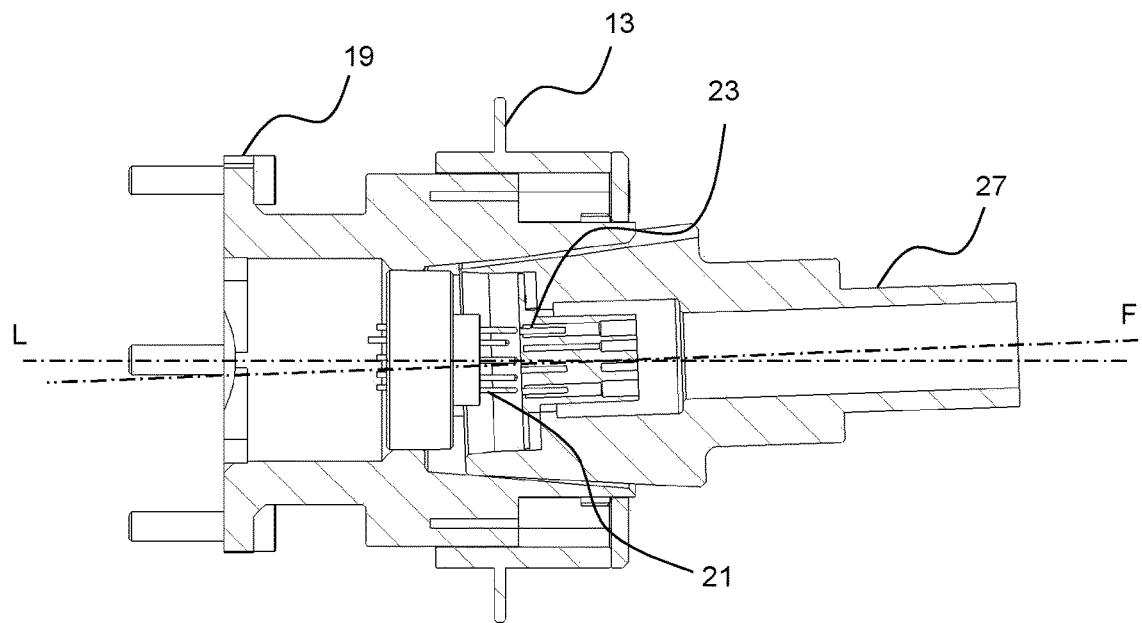
FIG. 5 shows a cross-sectional view according to FIG. 3 and FIG. 4, in which the coupling parts according to FIG. 1 and FIG. 2 are already to a greater extent pushed together but there is still no contacting of the electrical connection elements.

As can be seen in FIG. 5, a corresponding reduction of the play, enables a correct electrical contact between plug contacts 21 (prongs) and 23 (sockets). The play and thus the angle α at this insertion depth (the third threshold distance) is so small that in the case of further insertion, the plug contacts 21 and 23 automatically engage with one another in a correct position. The contacts 21 of coupling part 1 here are arranged, as shown in the figures, sufficiently far in the interior, preferably in the region of the bottom of the recess 7 (spaced apart from front surface 2), so that they connect with the contacts 23 in a substantially positionally correct position only later and beyond the third threshold distance, for example, starting at half, preferably ⅘ of the complete insertion depth/connecting distance.

In this way, mechanical damage due to careless handling is prevented. In addition, an—at worst unnoticed—incorrect assembly (but still an at least temporarily non-positive or positive locking connection) is prevented, without resulting in a loss of time during the assembly or disassembly of the quick coupling system.

Operation of the quick coupling system, according to an embodiment of the present invention, is described briefly as follows:

During assembly, by a retraction of the sleeve 13, the (clamping) rods 9 are pushed to the side, and the head 5 can be inserted into the recess 7.

The cross-sectional profile, as explained above, is designed so that the coupling parts 1 and 3 can be pushed together or the head 5 can be inserted into the recess 7 only if the orientation is correct.

If this is attempted with another orientation, for example, less than 90° or 180° from the correctly aligned longitudinal axial rotation of coupling part 1 with respect to coupling part 3, the possible insertion depth is so small (no more than the first threshold distance which may be a fifth or less of the connecting distance) that no connection can be established and this becomes immediately clear to user even in stressful situations.

The longitudinal profile is tapered, so that as head 5 is inserted into recess 7 beyond the first threshold amount, radial play (rotationally about axes L and F) is decreased. Contact of electrical plug connections 21 and 23 is established only when the decreased play due to the tapering places prongs 21 and sockets 23 essentially exactly opposite one another. In this way, mechanical damage to plug contacts 21 and 23 is prevented.

If the user then releases sleeve 13, it is pressed back by springs 25 into a starting position, whereupon clamping rods 9 are forced into corresponding grooves 11 of coupling part 3 (head 5), but preferably not in contact with a ground connection on head 5, and thus the system may remain energized.

As a result of the preferred design of the groves 11 as slopes, a force transmission occurs, as a result of which the clamping force between the coupling parts 1 and 3 is greater by a multiple than the force of the springs 25 used. In this way, the connection between coupling parts 1 and 3 is as free of play as possible while the corresponding shape of head 5 and recess 7 provides a positive mechanical engagement comprising an engagement that allows a torque to be applied from coupling part 1 to coupling part 3 about axes L and F.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE NUMERALS

1 Coupling part, steering wheel side (socket)
2 Front end of 1

3 Coupling part, vehicle side (plug)
4 Front end of 3
5 Head of 3
7 Recess of 1
9 (Clamping) rods (locking)
11 Grooves for rods 9
13 Sleeve (axially movably pretensioned with spring)
15 Engagement element (tongue or projection)
17 Engagement element (groove) for 15
19 Fixture for steering wheel
21 Plug contacts (prongs)
23 Plug contacts (sockets)
25 Springs
27 Steering column
L Longitudinal axis of the coupling part 1
F Longitudinal axis of the coupling part 3
α Angle between center axes L and F

The invention claimed is:

1. A quick coupling system for a vehicle steering wheel, the quick coupling system including:
    (a) a vehicle-side coupling part having a vehicle-side front end;
    (b) a steering wheel-side coupling part adapted to be connected to a steering wheel and having a steering wheel-side front end, the steering wheel-side coupling part adapted to be oriented with the steering wheel-side front end facing the vehicle-side front end and in that orientation pushed together with the vehicle-side coupling part over a connecting distance to place the steering wheel-side coupling part and the vehicle-side coupling part in an assembled state in which the steering wheel-side coupling part and vehicle-side coupling part extend along a system longitudinal center axis and mechanically engage each other in a positive locking manner, the connecting distance comprising a distance along the system longitudinal center axis between the steering wheel-side front end and the vehicle-side front end when the steering wheel-side coupling part and the vehicle-side coupling part are in the assembled state;
    (c) a steering wheel-side engagement element included on the steering wheel-side coupling part;
    (d) a vehicle-side engagement element included on the vehicle-side coupling part and having a shape that is complementary to a shape of the steering wheel-side engagement element so that the assembled state requires an alignment of the steering wheel-side engagement element with the vehicle-side engagement element with respect to a longitudinal axial rotational position of the steering wheel-side coupling part relative to the vehicle-side coupling part; and
    (e) wherein a front portion of the steering wheel-side engagement element is located in a region of the steering wheel-side front end and a front portion of the vehicle-side engagement element is located in a region of the vehicle-side front end so that the steering wheel-side coupling part can be pushed together with the vehicle-side coupling part no further than a first threshold distance when the steering wheel-side engagement element is not substantially aligned with the vehicle-side engagement element with respect to the longitudinal axial rotational position of the steering wheel-side coupling part relative to the vehicle-side coupling part, the first threshold distance being less than a fifth of the connecting distance.

2. The quick coupling system of claim 1 wherein the steering wheel-side engagement element and the vehicle-side engagement element are related as a non-rotationally symmetrical outer periphery an inner periphery complementary thereto.

3. The quick coupling system of claim 1 wherein the vehicle-side coupling part is connected to a steering mechanism of a vehicle, a vehicle simulator, or a vehicle driving game apparatus.

4. The quick coupling system of claim 1 wherein the first threshold distance is less than a tenth of the connecting distance.

5. The quick coupling system of claim 1 further including:
    (a) a vehicle-side electrical connection structure included on the vehicle-side coupling part;
    (b) a steering wheel-side electrical connection structure included on the steering wheel-side coupling part and adapted to establish an electrical connection with the vehicle-side electrical connection structure when the steering wheel-side coupling part and vehicle-side coupling part are in the assembled state; and
    (c) wherein the vehicle-side electrical connection structure is located on the vehicle-side coupling part so as to can make contact with the steering wheel-side electrical connection structure on the steering wheel-side coupling part only once the steering wheel-side coupling part has been pushed together at least a third threshold distance greater than the first threshold distance and in which position both the vehicle-side electrical connection structure and the steering wheel-side electrical connection structure are substantially aligned parallel with the system longitudinal center axis.

6. The quick coupling system of claim 5 wherein the vehicle-side electrical connection structure and the steering wheel-side electrical connection structure comprise respectively male and female plug contacts or respectively female and male plug contacts.

7. The quick coupling system of claim 1 wherein a front-most region of the vehicle-side coupling part or a front-most region of the steering wheel-side coupling part includes an insertion aid structure.

8. The quick coupling system of claim 7 wherein the insertion aid structure includes a structure that broadens or narrows in a longitudinal direction parallel to the system longitudinal center axis.

9. The quick coupling system of claim 8 wherein the insertion aid structure includes a tongue element formed on one of the steering wheel-side coupling part or the vehicle-side coupling part adapted to cooperate with a groove element formed on the other one of the steering wheel-side coupling part or the vehicle-side coupling part and is operable center the tongue element and groove element as the steering wheel-side coupling part and vehicle-side coupling part are pushed together over the connecting distance.

* * * * *